(12) United States Patent
Castro et al.

(10) Patent No.: US 11,609,386 B2
(45) Date of Patent: Mar. 21, 2023

(54) SYSTEM AND METHOD FOR INSERTION LOSS EVALUATION OF CONNECTORS

(71) Applicant: Panduit Corp., Tinley Park, IL (US)

(72) Inventors: Jose M. Castro, Naperville, IL (US); Yu Huang, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 244 days.

(21) Appl. No.: 16/906,665

(22) Filed: Jun. 19, 2020

(65) Prior Publication Data

US 2020/0408995 A1 Dec. 31, 2020

Related U.S. Application Data

(60) Provisional application No. 62/866,096, filed on Jun. 25, 2019.

(51) Int. Cl.
*G02B 6/38* (2006.01)
*G02B 26/08* (2006.01)

(52) U.S. Cl.
CPC ......... *G02B 6/385* (2013.01); *G02B 26/0833* (2013.01)

(58) Field of Classification Search
CPC ............ G02B 26/0833; G02B 26/0841; G02B 26/085; G02B 26/0858; G02B 6/385; G02B 6/3853
USPC ...................................................... 356/73.1
See application file for complete search history.

(56) References Cited

U.S. PATENT DOCUMENTS

| | | | |
|---|---|---|---|
| 10,514,511 B2 * | 12/2019 | Castro | G02B 6/385 |
| 2007/0040921 A1 * | 2/2007 | Davis | H04N 5/7458 348/E5.142 |
| 2011/0141459 A1 * | 6/2011 | Onoda | G01D 5/35316 356/73.1 |
| 2016/0091392 A1 * | 3/2016 | Fusco | G01M 11/33 356/73.1 |
| 2019/0353841 A1 * | 11/2019 | Sillard | G02B 6/0365 |
| 2022/0018883 A1 * | 1/2022 | Ugur | H03F 3/21 |

FOREIGN PATENT DOCUMENTS

| | | | |
|---|---|---|---|
| CN | 205121146 U | * 3/2016 | |
| JP | 2005141043 A | * 6/2005 | |
| WO | WO-02101957 A1 | * 12/2002 | G02B 6/262 |

* cited by examiner

*Primary Examiner* — Sunghee Y Gray
(74) *Attorney, Agent, or Firm* — Christopher S. Clancy; James H. Williams; Peter S. Lee (57) ABSTRACT

Various implementations of systems and methods for insertion loss estimation are disclosed. The system for insertion loss estimation includes a first filter, a focusing component, and a digital micromirror device (DMD). The first filter, the focusing component, and the DMD are in parallel with an optical fiber connector. Additionally, the system includes an optical concentrator and a photodetector device. A first face of the optical concentrator is facing towards the DMD, and a second face of the optical concentrator is facing the photodetector device. Both the photodetector device and the optical concentrator are in parallel.

18 Claims, 7 Drawing Sheets

SYSTEM AND METHOD FOR INSERTION LOSS EVALUATION OF CONNECTORS

CROSS-REFERENCE TO RELATED APPLICATION(S)

This application claims benefit to U.S. Provisional Patent Application No. 62/866,096, filed on Jun. 25, 2019, the entirety of which is hereby incorporated by reference herein.

BACKGROUND

When working in the field of fiber optics, operators often establish connections between non-connectorized ends of optical fibers or fiber ribbons. This is generally referred to as splicing, and it may involve creating temporary or permanent joints between two fibers.

To avoid significant loss of signal and minimize the reflectance or light leakage within the joints, users may need to ensure that the fibers are properly cleaved, the fibers are precisely aligned, and that the transparent gel or optical adhesive between the fibers matches the optical properties of the glass. However, these details are not always easy to detect and ensure.

A camera capturing an image of infrared (IR) radiation patterns can provide an accurate estimation of insertion loss. Such camera-based devices may utilize a filter to block visible light. However, sunlight has a great impact on IR wavelengths. Thus, typical IR patterns may not be detected by a camera under direct sunlight. Therefore, a need exists for apparatuses and methods directed towards a fiber termination tool that is operable under direct sunlight.

SUMMARY

The present disclosure provides for new and innovative systems and methods for insertion loss evaluation. An example system for insertion loss evaluation includes a first filter, a focusing component, and a digital micromirror device (DMD). The first filter, the focusing component, and the DMD are in parallel with an optical fiber connector. Additionally, the system includes an optical concentrator and a photodetector device. A first face of the optical concentrator is facing towards the DMD, and a second face of the optical concentrator is facing the photodetector device. Both the photodetector device and the optical concentrator are in parallel.

An example method for insertion loss evaluation includes a light source emitting light in a spectral region into an optical connector. Next, a DMD rotates mirrors towards a photodetector device. The rotation of mirrors may be a row of mirrors, a single mirror, a column of mirrors, or some combination thereof per unit time. The photodetector device captures images reflected from the mirrors over time and reconstructs a radiation pattern of the optical connector based on captured images of the photodetector device.

BRIEF DESCRIPTION OF THE DRAWINGS

The following detailed description references the drawings, wherein.

DETAILED DESCRIPTION

As noted above, mechanical splicing often occurs when a field optical fiber 114 is connectorized to a pre-manufactured fiber optic connector with a stub fiber 112 embedded therein. An example of such a connector is shown in FIG. 1.

Figure 2:
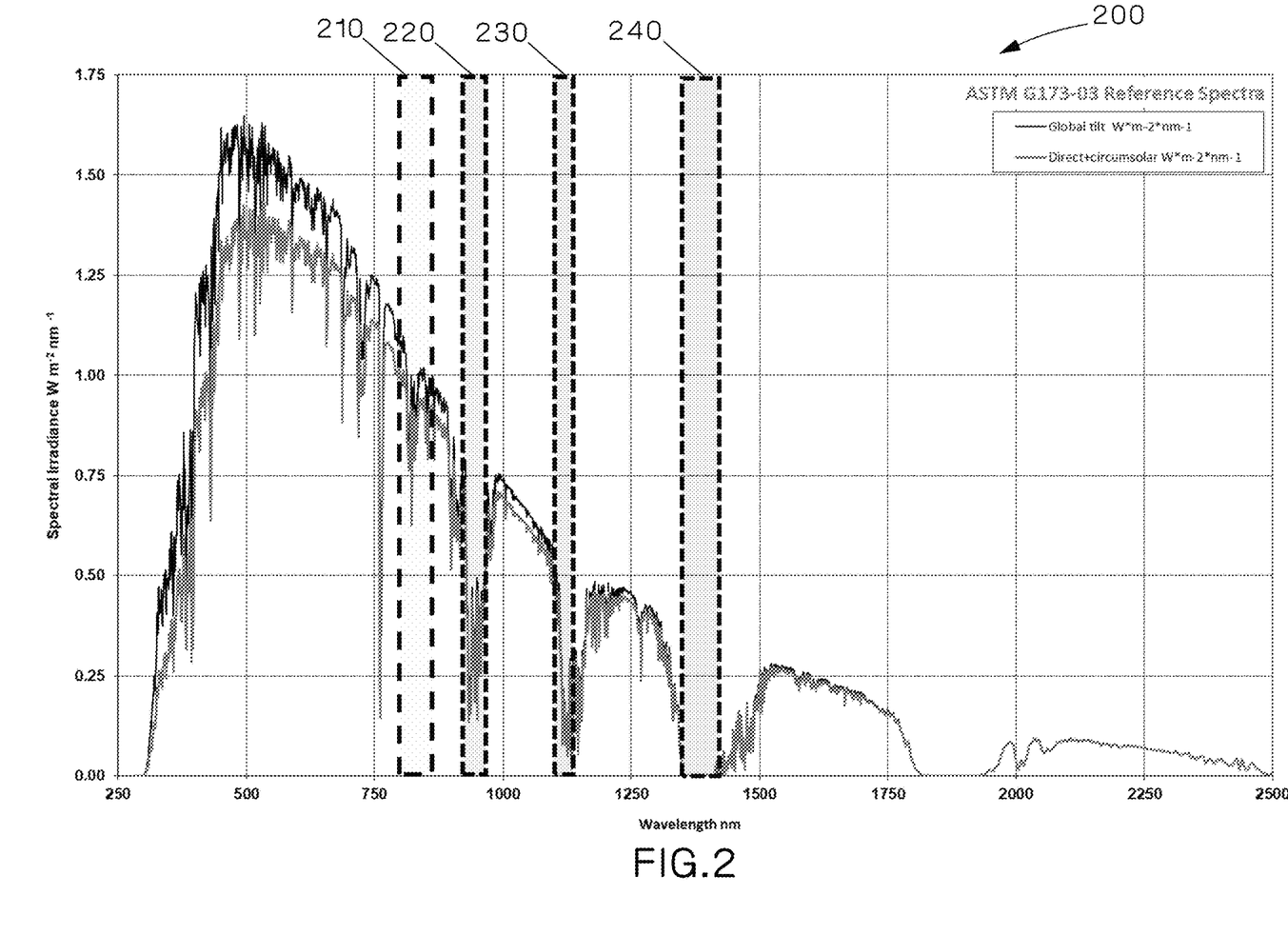
FIG. 2 is a graph of solar spectrum AM1.5.

A camera capturing an image of infrared (IR) radiation patterns can provide an accurate estimation of insertion loss. However, sunlight has a great impact on IR wavelengths, as shown in FIG. 2. Thus, typical IR patterns may not be detected by a camera under direct sunlight. Therefore, a need exists for apparatuses and methods directed towards a fiber termination tool that is operable under direct sunlight.

These and other objects, features, and advantages of the present disclosure will become apparent to those having ordinary skill in the art upon reading this disclosure.

Figure 1:
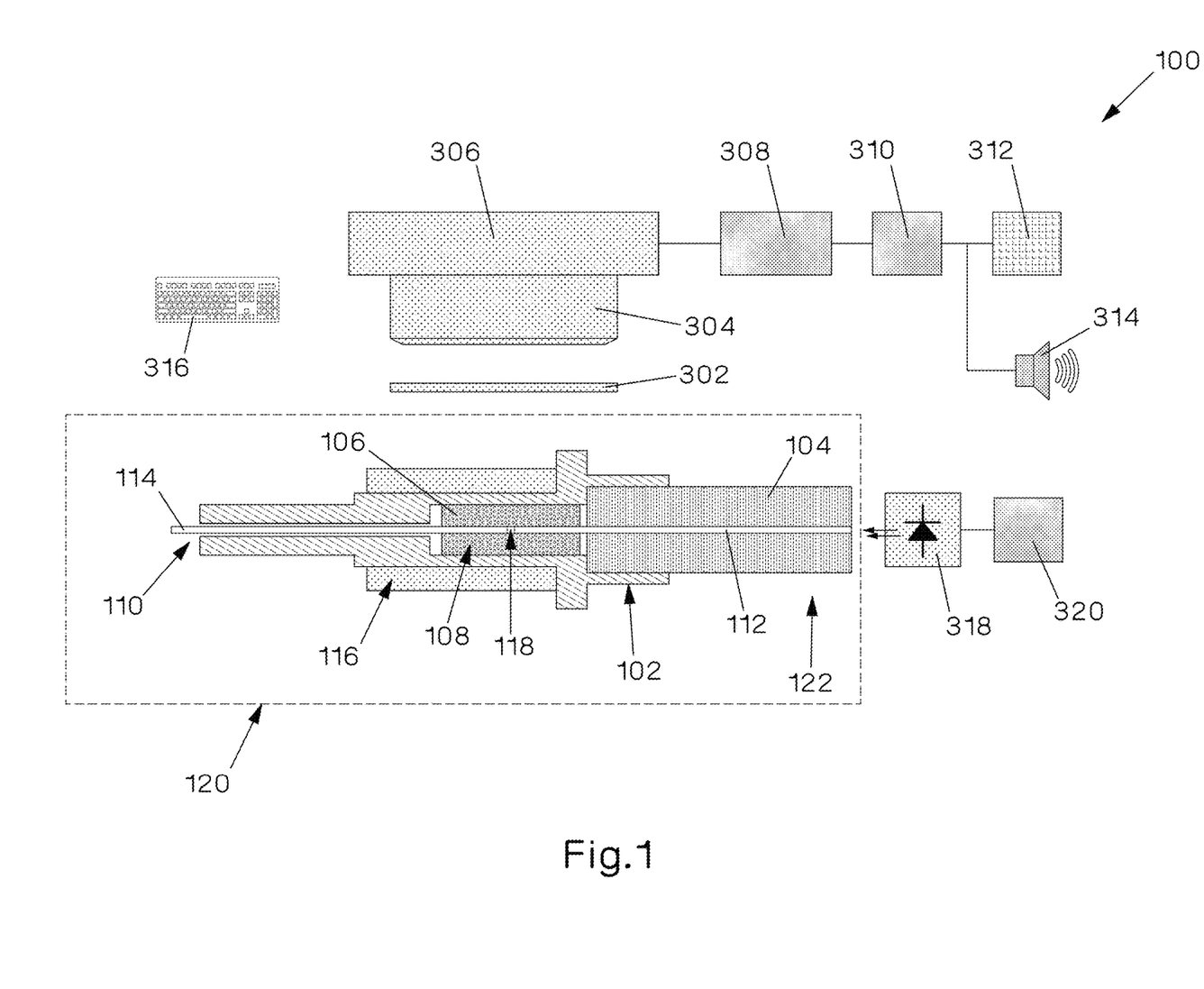
FIG. 1 is an illustration of an implementation of an optical fiber termination system.

FIG. 1 is an illustration of an example implementation of an optical fiber termination system 100. The optical fiber termination system 100 includes various components, such as a connector system 120, which may be a re-terminable optical fiber connector; a filter 302; an optical lens or diffractive component 304; a digital camera 306; a processor 308; an electronic driver 320; and a light source 318, such as an LED or laser device. The optical fiber termination system 100 may additionally include a communication device 310, such as a Bluetooth or Wi-Fi device; an output device, such as a visible transducer 312 and/or an audible transducer 314, and an input device 316, such as a keyboard.

Connector system 120 is used to terminate an optical field fiber 114 to a stub fiber 112 of a fiber optic connector. The connector system 120 may include a ferrule holder 102, a ferrule 104, a stub fiber 112, a top plank 106, a bottom plank 108, a field fiber 114, and a cam member 116.

The ferrule holder 102 holds the ferrule 104 at a front end 122 of the connector system 120. The top plank 106 and the bottom plank 108 are positioned between the ferrule 104 and a distal end 110 of the connector system 120. The stub fiber 112 extends from the outer edge of the ferrule 104 at the front end 122 (which may later interface with an adapter (not shown)), to an inner portion of the connector system 120 in the general area of the top plank 106 and the bottom plank 108. The stub fiber 112 may be embedded in the fiber optic connector at the time of manufacture.

To splice the stub fiber 112 with the field fiber 114 a user inserts the field fiber 114 into the connector system 120 through the distal end 110. The user aligns both fibers and activates the cam member 116 to clamp the field fiber 114 and the stub fiber 112 in place, forming an interface of the two fibers. This interface is shown in FIG. 1 as a splice joint 118.

Prior to mechanically splicing the fibers together, it may be advantageous to ensure well-executed splices so that light leakage and reflection are minimized. To do so, images of the connector system 120 are captured to determine the quality of the splice. In the example, the all or almost all of the connector system 120 is positioned within the field of view of the digital camera 306.

Initially, a user turns on the optical fiber termination system 100, supplying power to all necessary power-consuming components such as, but not limited to, the light source 318, the digital camera 306, the processor 308 and/or other connected electronics, the communication device 310, the electronic driver 320, and/or the output devices 312 and 314.

The electronic driver 320 generates continuous or pulsed signals to the light source 318. The light source 318 is a visible or IR light source. The light source 318 launches light to the optical connector being tested (including ferrule 104 and/or stub fiber 112) using free space optics such as a lens, diffractive component, or a launch optical patch cord. In the example, the light source 318 may be a semiconductor laser capable of emitting light having a spectral range within the optical sensitivity of the video camera 306, typically between about 450 nm to 630 nm for visible operation, or between 700 nm to 1700 nm for IR operation.

FIG. 2 depicts a graph 200 of solar spectrum AM1.5. Graph 200 depicts various regions 210, 220, 230 and 240 emphasized using dashed rectangles. Currently, operation in the spectral region 210 (850 nm±20 nm) is common due to the low cost of vertical surface emitting lasers (VCSELs) and CMOS imaging sensors sensitive to that spectral region. However, due to significant amounts of sunlight energy at those wavelengths the operation of tools such as the present optical fiber termination system 100 would be limited to indoor use. Thus, the example embodiment of FIG. 1 preferably operates in the spectral region 220 (920-980 nm) where atmospheric light attenuation is high due to $H_2O$ absorption. Relatively inexpensive VCSELs and CMOS cameras sensitive in the range 220 are currently available on the market. Regions 230 (1150 nm-170 nm) and 240 (1325 nm-1400 nm), where atmospheric light attenuation is high due to $H_2O$ absorption, are discussed in further detail below.

Returning to FIG. 1, after light is emitted by the light source 318 into the ferrule 104, the light scatters as it passes through the connector system 120. Before capturing the spatial pattern of scattered light by the digital camera 306, the scattered light passes through the filter 302. The filter 302 operates as a band-pass filter for specific regions of the optical spectrum. The filter 302 is designed to filter center wavelengths in the range of 900 nm-1700 nm. More specifically, the filter 302 allows the transmission of specific regions of the optical spectrum (e.g., 920-980 nm) to the optical lens 304 and/or the digital camera 306.

The optical lens 304 directs and focuses light towards an imaging device, such as the digital camera 306. The digital camera 306 captures the images of scattered light emanating from multiple regions of the connector system 120.

In an alternate embodiment, the imaging device (the digital camera 306) is a camera sensor or an array of optical detectors. Digital cameras, such as the digital camera 306, may include an IR stopband filter which is common to most commercial cameras. This stopband filter may be removed and replaced by the filter 302 which is an IR band-pass filter.

The images captured by the digital camera 306 are processed using digital signal processing algorithms stored in the processor 308. Additionally, the optical fiber termination system 100 uses the processor 308 for image acquisition and for controlling functionalities of the apparatus. These functionalities may include a user input device 316, such as a keyboard, or output devices, such as the visible or audible transducers 312 and 314 respectively.

The optical fiber termination system 100 may additionally include a display unit (not shown) to assist the user during the installation process and to indicate a pass/fail termination condition. Additionally, the optical fiber termination system 100 may also include provisions for communication with other devices using Bluetooth or communication device 310 (e.g., Wi-Fi device), which may use wireless communication protocols for remote control or uploading connector installation data.

Figure 3:
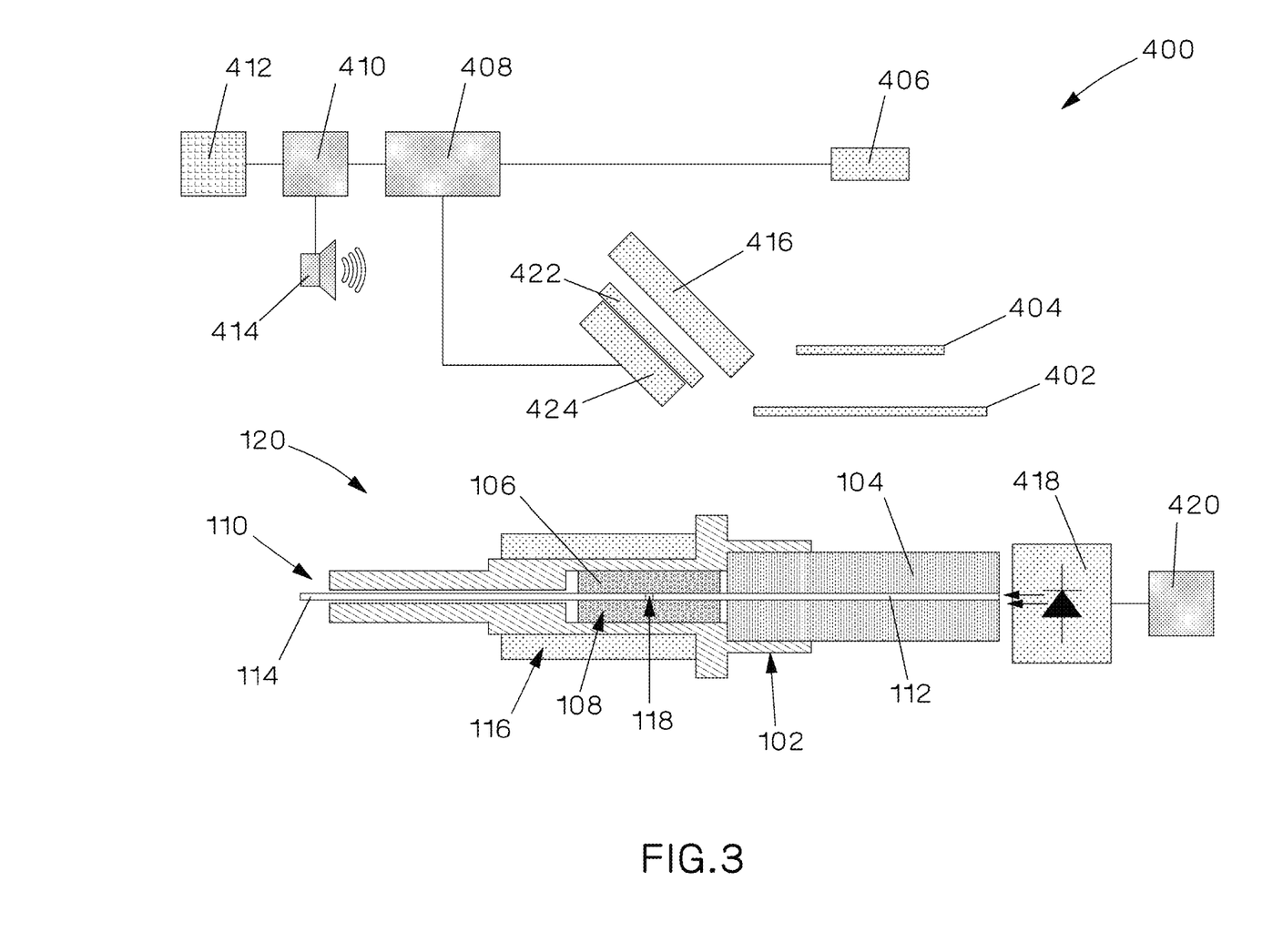
FIG. 3 is an illustration of an example implementation of an optical fiber termination system.

FIG. 3 discloses an embodiment of an optical fiber termination system 400 operating in the spectral regions 230 and 240 of FIG. 2. The optical fiber termination system 400 includes a similar connector system 120 as depicted in FIG. 1. The optical fiber termination system 400 also includes various components, such as a first filter 402; a focusing component 404; a digital micromirror device (DMD) 406; an optical concentrator 416; a photodetector device 424; electronics componentry or processor 408; an electronic driver 420; and a light source 418, such as an LED or laser device. The optical fiber termination system 400 may additionally include a second filter 422; a communication device 410, such as a Bluetooth or Wi-Fi device; output devices, such as a visible transducer 412 and/or an audible transducer 414; and an input device, such as a keyboard (not shown).

In the embodiment, the electronic driver 420 is similar to the electronic driver 320 in FIG. 1. Further, the light source 418 is similar to the light source 318 in FIG. 1.

The optical fiber termination system 400 helps a user terminate a field fiber 114 to a pre-polished connector stub fiber 112 and test the quality of the splice joint 118. To do so, the electronic driver 420 generates continuous or pulsed signals to the light source 418. The light source 418 is an IR light source, which may be an LED or laser device. The light source 418 emits light within the spectral regions 230 (1150 nm-170 nm) and/or 240 (1325 nm-1400 nm) of FIG. 2. The emitted light is launched into the ferrule 104 and/or the stub fiber 112.

The light launched into the ferrule 104 creates a scattered spatial pattern as it travels through the connector system 120. The scattered light first passes through the first optical filter 402. The first optical filter 402 is tuned to approximately match the wavelength of the optical source (within the spectral regions 230 (1150 nm-170 nm) and/or 240 (1325 nm-1400 nm) of FIG. 2). The first filter 402 is a band-pass filter similar to the filter 302 in FIG. 1. However, the first filter 402 and the filter 302 of FIG. 1 may filter different optical ranges, and thus may be constructed of different materials. In an embodiment, the first filter 402 may filter a wider spectral range than only the spectral regions 230 and/or 240 of FIG. 2.

The scattered light travels through the first filter 402 prior to reaching the focusing component 404. The focusing component 404 may be a lens or diffractive optical feature which directs and focuses the light towards the DMD 406. The DMD 406 may also be known as a digital light projector (DLP) device. The DMD 406 has on its surface a plurality of small mirrors arranged in a rectangular array which correspond to pixels in an image to be displayed. The mirrors can be individually rotated to an on or off state.

As seen in exemplary FIG. 3, the focusing component 404 is spaced closer to the first filter 402 than the DMD 406. However, spacing between the components will vary depending on the focal lengths of the lenses, such as focusing component 404, and the DMD 406. In the example, the first filter 402, the focusing component 404, and the DMD 406 are all arranged in parallel with the connector system 120. More specifically, respective face surfaces of the first filter 402, the focusing component 404, and the DMD 406 may be all arranged in parallel with each other. Therefore, generally each portion of the connector system 120 may be in the field of view of the DMD 406.

The DMD 406 is operated by electronic components, for example a processor 408, which controls the rotation of each of the mirrors and the scanning pattern of the DMD 406. Each mirror, column of mirrors, row of mirrors, etc. is rotated according to a scanning pattern. The scanning pattern will cause the rotation of at least one mirror, column of mirrors, row of mirrors, etc. in one unit of time. A unit of time in the present example may be any unit of time, such as a millisecond, microseconds, tens of microseconds, etc. Any time unit may be utilized, and the unit of time may vary depending on the types of sensors, photodetectors, etc. utilized.

The micromirror array of the DMD 406 directs light towards the optical concentrator 416. In the example, the optical concentrator 416 is angled towards the DMD 406. The optical concentrator 416 may be an optical lens or non-imaging collector (e.g., a compound parabolic concentrator). The optical concentrator 416 collects the light reflected by the DMD 406 with higher efficiency than a focusing component, such as focusing component 404, as the optical concentrator 416 is not required to preserve the image information conveyed by the light, only its power.

A second optical filter 422 is optionally included and may be located in front of the optical concentrator 416 (between the DMD 406 and the optical concentrator 416) or behind the optical concentrator 416 (between the optical concentrator 416 and a photodetector device 424). The second optical filter 422 may be a thin-film filter, also a narrow band-pass filter. In comparison to the first filter 402, which is a coarse filter allowing a broader range of the spectrum to filter through to the DMD 406, the second optical filter 422 is better tuned to the light source 418.

The light bouncing off each of the mirrors in the DMD 406 travels through the optical concentrator 416 and the second optical filter 422 prior to reaching a photodetector device 424. The photodetector device 424 is highly sensitive and used to receive the light reflected from the DMD 406. In an alternate embodiment, the photodetector device 424 may be a photodetector array. The photodetector device 424, the second filter 422, and the optical concentrator 416 may all be in parallel to each other to be angled toward the DMD 406. More specifically, respective face surfaces for each of the photodetector device 424, the second filter 422, and the optical concentrator 416 may be parallel to each other and angled toward the DMD 406. In this example, one face (a first face) of the optical concentrator 416 is facing towards the DMD 406, and the other face (a second face) of the optical concentrator 416 is facing the photodetector device 424.

The active array of micromirrors on the DMD 406 (or other diffractive feature) is used to direct light from a localized area of the connector system 120 at different time intervals. A scanning pattern controlled by the processor 408 enables the transmission of light to the photodetector device 424 such that a reconstruction of an image from a temporal measurement of intensity is produced. The micromirrors of the DMD 406 send images pixel by pixel (micromirror by micromirror), column by column, row by row, or some combination thereof, multiplexed in time to the photodetector device 424.

The processor 408 executes the image acquisition algorithm, controls, and all functionalities of the optical fiber termination system 400, including controlling the DMD 406, the visible and audible transducers 412 and 414, the Bluetooth/Wi-Fi device 410, the input devices (not shown), and the display units (not shown). Therefore, the processor 408 causes and/or controls movement of each individual mirror or groups of mirrors on the DMD 406. In an alternate embodiment, the DMD 406 controls the movements of the individual or groups of mirrors and is directed to do so by the processor 408. The display unit (not shown) may assist a user during the installation process to indicate a pass/fail termination condition. The Bluetooth/Wi-Fi device 410 may use wireless communication protocols for remote control or uploading connector installation data.

Using the optical fiber termination system 400 enables the reconstruction of a high-resolution image with an inexpensive camera (e.g., a one pixel or very few pixel camera) sensitive to the spectral regions of 230 and/or 240 of FIG. 2.

Figure 4A:
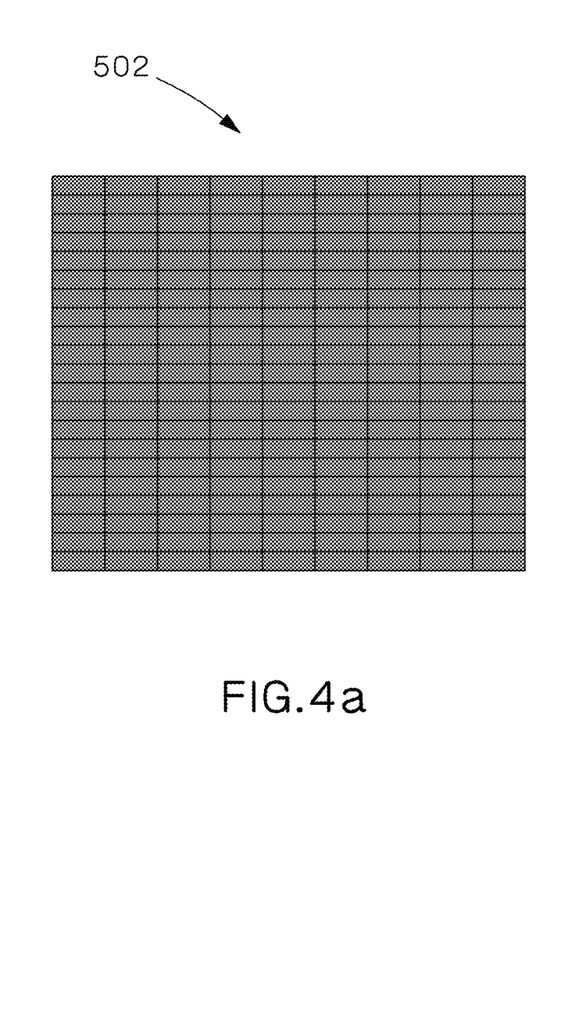
FIG. 4a is an illustration of an array of mirrors in a digital micromirror device (DMD) when no mirrors reflect light towards a photodetector device in the optical fiber termination system of FIG. 3.

FIGS. 4 to 6 disclose examples of operation of the DMD 406 with the active array of micromirrors. FIG. 4(a) is an illustration 502 of none of the micromirrors of the DMD 406 in FIG. 3 rotated toward the photodetector device 424 to reflect the scattered light emanating from the connector system 120. For example, all the micromirrors of the DMD 406 may be oriented at zero degrees (no tilt). Based on the example configuration of FIG. 3, no light is reflected/transmitted to the photodetector device 424, and therefore no image of the connector system 120 can be reconstructed.

Figure 4B:
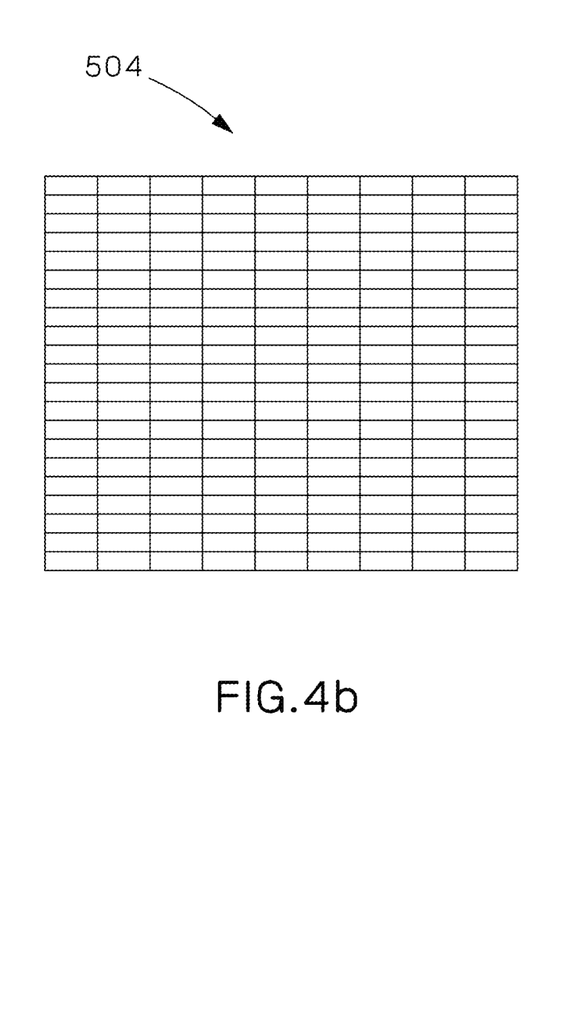
FIG. 4b is an illustration of the array of mirrors in the DMD when all mirrors reflect light towards a photodetector device in the optical fiber termination system of FIG. 3.

FIG. 4(b) is an illustration 504 of all the micromirrors of the DMD 406 in FIG. 3 rotated toward the photodetector device 424 to reflect the scattered light emanating from the connector system 120. As shown in the example, light from the whole connector system 120 reaches the photodetector device 424 at once because all the micromirrors are angled to direct light towards the photodetector device 424. Therefore, it is impossible to reconstruct an image of the connector system 120.

Figure 5:
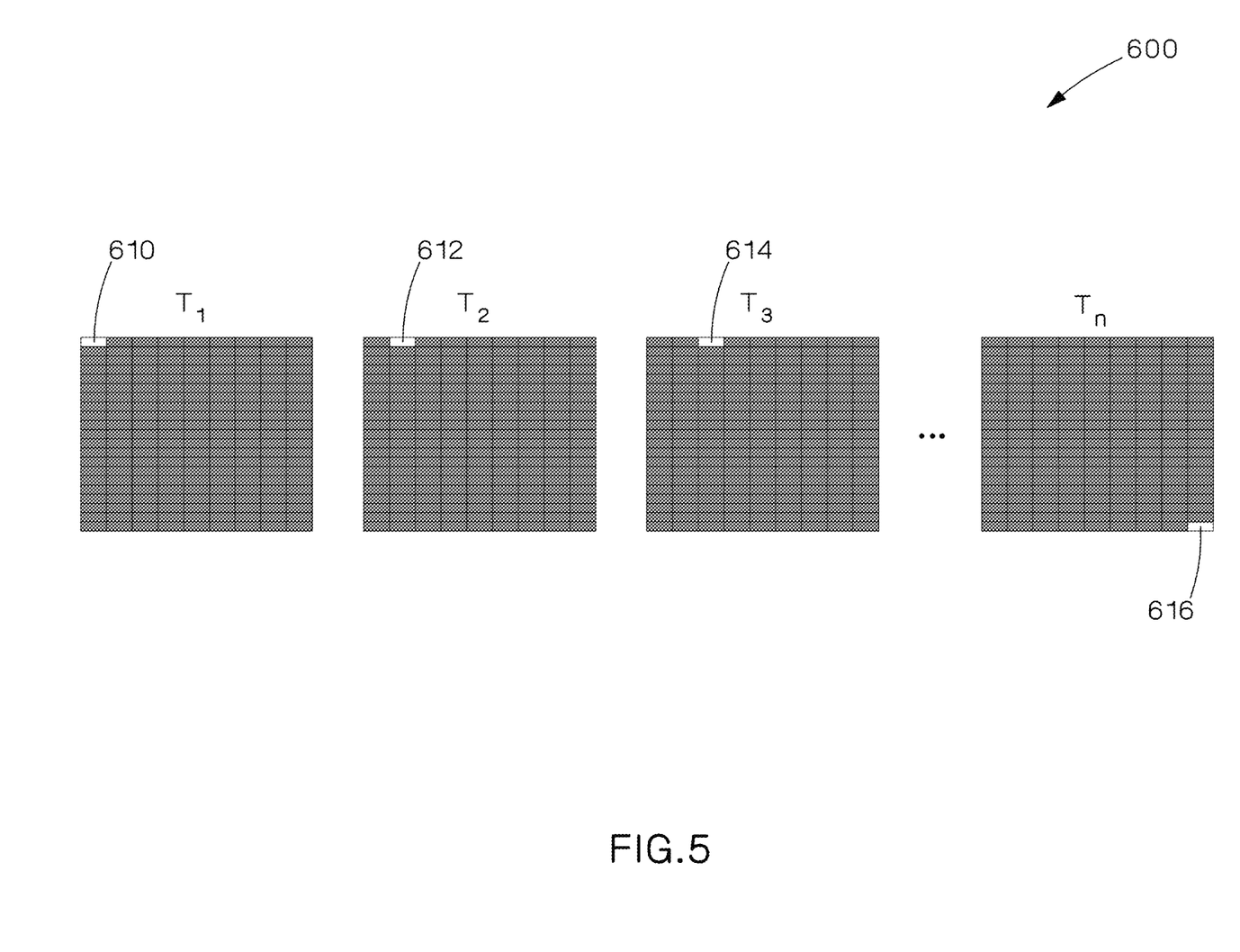
FIG. 5 is an illustration of rotating a single mirror at a time of the DMD to reflect light towards a photodetector device in the optical fiber termination system of FIG. 3.

FIG. 5 is an illustration 600 of rotating a single mirror of the DMD 406 per unit time towards the photodetector device 424. As shown in illustration 600, the position of the active micromirror changes with time. For example, at a time T1 a micromirror 610 is rotated towards the photodetector device 424. The photodetector device 424 will capture the image from the micromirror 610 during the time interval T1. Subsequently, at a time T2 a micromirror 612 is rotated towards the photodetector device 424, and the photodetector device 424 will capture the image. At a time T3 the micromirror 614 is rotated towards the photodetector device 424, and the photodetector device 424 will capture the image. This continues until a time Tn, where a final micromirror 616 is rotated towards the photodetector device 424, and the photodetector device 424 will capture the image. After the photodetector device 424 receives and captures the light from all the micromirrors it can reconstruct the image produced by the radiation pattern of the connector system 120.

Important information when estimating insertion loss is the relative intensity profiles of the captured images. Therefore, it may be advantageous to capture the radiation pattern of the scattered light of the connector system 120 in a faster manner than pixel by pixel. In an embodiment, columns of micromirrors can be directed towards the photodetector array 424 in one unit of time.

Figure 6:
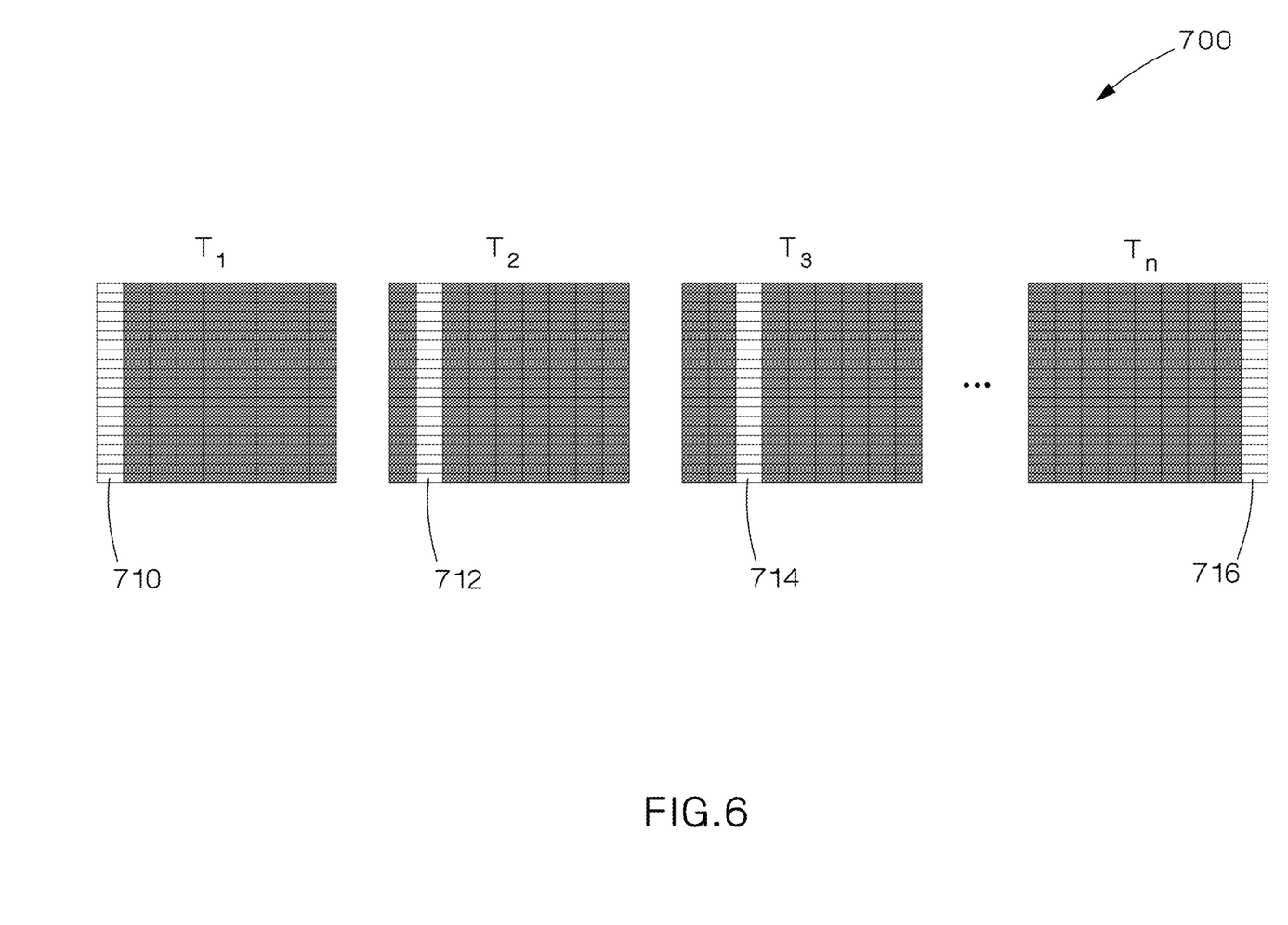
FIG. 6 is an illustration of rotating a column of mirrors at a time to reflect light towards a photodetector device in the optical fiber termination system of FIG. 3.

FIG. 6 is an illustration 700 of rotating a column of micromirrors of the DMD 406 per unit time towards the photodetector device 424. The position of the active micromirror column changes with time as shown in FIG. 6. For example, at a time T1 a column 710 is rotated towards the photodetector device 424. The photodetector device 424 will capture an image from the micromirror column 710 during the time interval T1. At a time T2 a column 712 is rotated towards the photodetector device 424, and the photodetector device 424 will capture the image. At a time T3 a column 714 is rotated towards the photodetector device 424, and the photodetector device 424 will capture the image. This continues until a time Tn, where a final column 716 is rotated towards the photodetector device 424, and the photodetector device 424 will capture the image. After the photodetector device 424 receives the light from all the micromirror columns, it can reconstruct the relative intensity profile of the radiation pattern of the connector system 120. In an alternate embodiment, processor 408 may reconstruct the intensity profile radiation pattern. The reconstructed intensity profile radiation pattern may be displayed to a user. Alternatively, a pass or fail indication, visually or audibly, may be indicated to a user.

In an alternate embodiment, a user may desire to rotate a row of micromirrors of the DMD 406 towards the photodetector array 424 per unit time. In a further alternate embodiment, a user may desire to capture and reconstruct images using some combination of rotating rows, columns, or individual micromirrors over time. In a further alternate embodiment, a user may desire to capture and reconstruct images using only select rows, columns, and/or individual mirrors over time.

Figure 7:
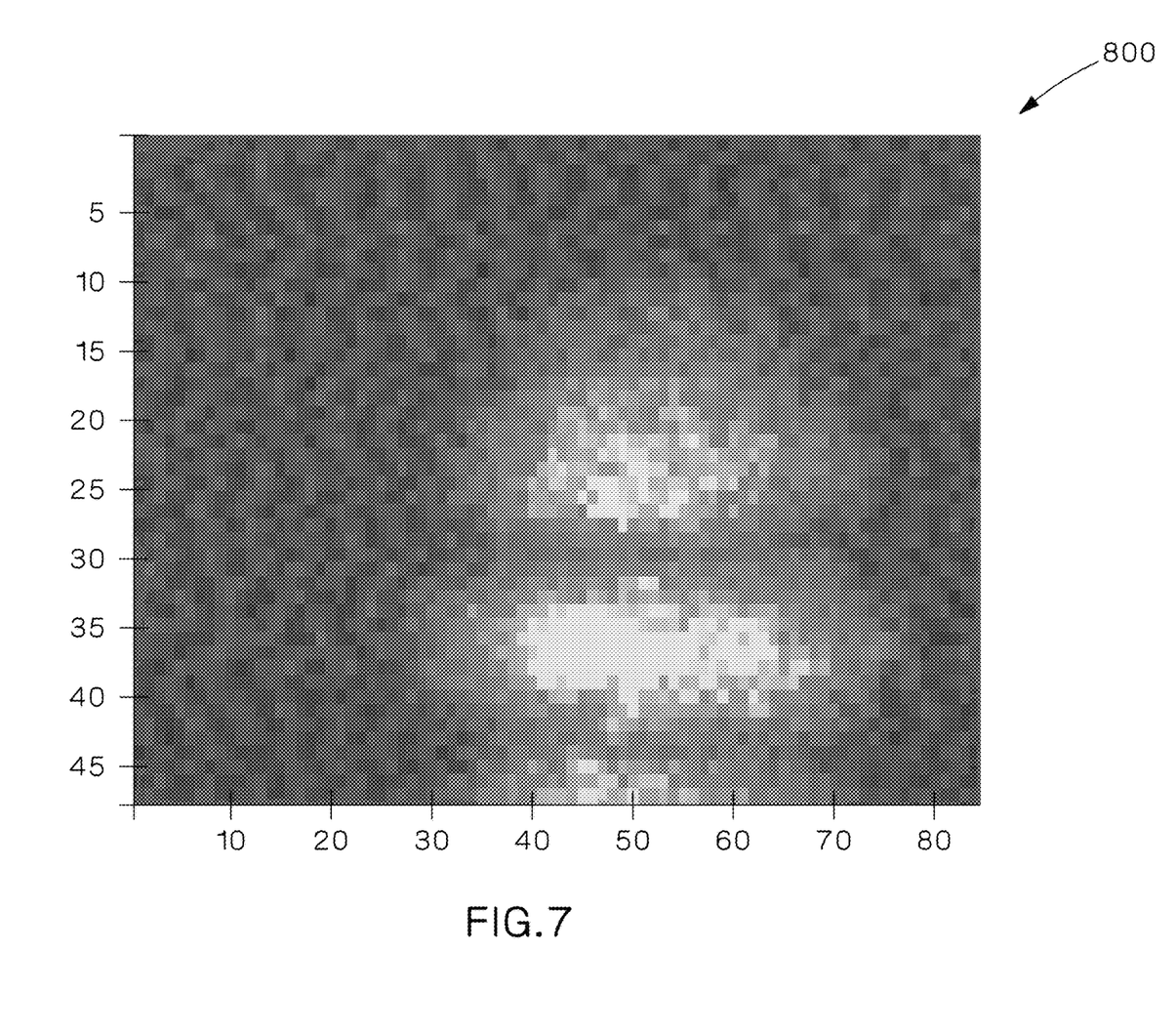
FIG. 7 is an illustration of a captured infrared (IR) image according to an embodiment of the present disclosure.

FIG. 7 is a reconstructed illustration 800 of a captured IR image according to an embodiment of the present disclosure. For this example, a reflective pattern with metallic lines was used with dimensions on the order to 20 microns (width) as the object to be imaged. The metallic lines reflect the light acting as mirrors. The micromirrors of the DMD 406 of the disclosure are used to redirect the light from the object under test towards the photodetector device 424. The position of the active micromirror column changes sequentially with time as described previously. The light collected at different times by the photodetector device 424 is used to produce an image of the reflective pattern object. In the image shown in FIG. 7, the horizontal and vertical axis of the image represent the detected pixel number after the light is received by a photodetector 424. The intensity of the collected light from the reflective pattern is shown using a gray scale. The dark areas correspond to non-reflective areas of the utilized pattern. The brighter spots correspond to areas of maximum reflection (the metallic lines). Two lines of the multiple reflective lines of the pattern are imaged in this example using the method disclosed here. The example demonstrates the image functionalities of the disclosure using a photodetector.

The disclosed examples describe capturing high-resolution images of radiation patterns at the wavelengths where sunlight illumination is weak, using a high-speed and low-cost imaging system.

Note that while the present disclosure includes several embodiments, these embodiments are non-limiting, and there are alterations, permutations, and equivalents, which fall within the scope of the features described in this disclosure. Additionally, the described embodiments should not be interpreted as mutually exclusive and should instead be understood as potentially combinable if such combinations are permissive. It should also be noted that there are many alternative ways of implementing the embodiments of the present disclosure. It is therefore intended that claims that may follow be interpreted as including all such alterations, permutations, and equivalents as fall within the true spirit and scope of the present disclosure.

What is claimed is:

1. An optical fiber connector loss measurement system, comprising:
    a light source, wherein the light source is configured to transmit light into a stub fiber included in an optical fiber connector being tested by the optical fiber connector loss measurement system;
    a first filter configured to received light passed from the optical fiber connector;
    a focusing component configured to receive light passed from the first filter;
    a digital micromirror device (DMD) configured to receive light passed from the focusing component, wherein respective faces of the first filter and the focusing component are in parallel and both faces of the first filter and the focusing component face towards the DMD;
    an optical concentrator configured to receive light passed from the DMD, wherein a face of the optical concentrator faces towards the DMD; and
    a photodetector device configured to receive light passed from the optical concentrator and form an image based on the light received from the optical concentrator, wherein a face of the optical concentrator faces the photodetector device, and wherein the face of the photodetector device and the face of the optical concentrator are in parallel.

2. The optical fiber connector loss measurement system of claim 1, further comprising:
    a second filter located between the optical concentrator and the photodetector device.

3. The optical fiber connector loss measurement system of claim 1, further comprising:
    a second filter located between the DMD and the optical concentrator.

4. The optical fiber connector loss measurement system of claim 1, further comprising:
    a second filter, wherein the second filter is a thin film filter.

5. The optical fiber connector loss measurement system of claim 1, wherein the first filter is a coarse filter.

6. The optical fiber connector loss measurement system of claim 1, wherein the light transmitted into the stub fiber has a center wavelength in a range of 920 to 980 nm.

7. The optical fiber connector loss measurement system of claim 6, wherein the first filter is a bandpass filter filtering to include frequencies within the range of 920 to 980 nm.

8. The optical fiber connector loss measurement system of claim 1, wherein the light transmitting into the stub fiber has a center wavelength in a range of 1150 to 1170 nm.

9. The optical fiber connector loss measurement system of claim 8, wherein the first filter is a bandpass filter filtering to include frequencies within the range of 1150 to 1170 nm.

10. The optical fiber connector loss measurement system of claim 1, wherein the light transmitted into the stub fiber has a center wavelength in a range of 1325 to 1400 nm.

11. The optical fiber connector loss measurement system of claim 10, wherein the first filter is a bandpass filter filtering to include frequencies within the range of 1325 to 1400 nm.

12. The optical fiber connector loss measurement system of claim 1, further comprising:

an electronic driver, wherein the electronic driver delivers at least one of continuous and pulsed signals to the light source.

13. The optical fiber connector loss measurement system of claim 1, wherein the DMD includes a plurality of mirrors.

14. The optical fiber connector loss measurement system of claim 13, wherein each mirror in the plurality of mirrors focuses light toward the photodetector device one at a time.

15. The optical fiber connector loss measurement system of claim 13, wherein each column of mirrors in the plurality of mirrors focuses light toward the photodetector device one at a time.

16. The optical fiber connector loss measurement system of claim 15, wherein select mirrors in the plurality of mirrors focus light toward the photodetector device.

17. The optical fiber connector loss measurement system of claim 1, further comprising:
   a processor, wherein the processor is configured to control movement of a plurality of mirrors located on the DMD; and
   at least one of an input device or a transducer is connected to the processor.

18. The optical fiber connector loss measurement system of claim 1, wherein the optical fiber connector further includes a field fiber spliced to the stub fiber, wherein a splice joint is formed where the field fiber is spliced to the stub fiber.

* * * * *